United States Patent [19]

Brancati

[11] Patent Number: 4,761,809
[45] Date of Patent: Aug. 2, 1988

[54] COIN RETURN CHUTE FOR TELEPHONE PAY STATION

[75] Inventor: Rudolph P. Brancati, Richmond Hill, N.Y.

[73] Assignee: Nynex Corporation, New York, N.Y.

[21] Appl. No.: 78,218

[22] Filed: Jul. 27, 1987

[51] Int. Cl.$^4$ .......................................... H04M 17/00
[52] U.S. Cl. .................... 379/150; 379/145; 194/202
[58] Field of Search ............... 379/145, 150; 194/202, 194/344, 347

[56] References Cited

U.S. PATENT DOCUMENTS

| 694,960 | 3/1902 | Grey | 379/150 |
|---|---|---|---|
| 800,450 | 9/1905 | Kleem et al. | 194/344 |
| 884,589 | 4/1908 | Jenkins | 194/344 |
| 892,322 | 6/1908 | Smythe | 379/150 |
| 1,060,307 | 4/1913 | Bailey | 194/344 |
| 1,887,576 | 11/1932 | Bollinger . | |
| 1,901,944 | 3/1933 | Allen . | |
| 1,921,071 | 8/1933 | Edwards . | |
| 1,921,072 | 8/1933 | Edwards . | |
| 1,951,887 | 3/1984 | Templeton et al. | 194/202 |
| 1,977,884 | 1/1931 | Long | 194/202 |
| 2,004,615 | 6/1935 | Mills . | |
| 2,021,894 | 11/1935 | Chase | 194/202 |
| 2,037,174 | 4/1936 | Mills et al. | 194/344 |
| 3,279,574 | 10/1966 | Seiden | 194/202 |

FOREIGN PATENT DOCUMENTS 0216025 4/1987 European Pat. Off. ............ 194/202

Primary Examiner—Robert Lev
Attorney, Agent, or Firm—Robin, Blecker & Daley

[57] ABSTRACT

A coin return chute for a telephone pay station wherein the throat of the chute is provided with means for inhibiting stuffing of material into the throat while allowing passage of coins.

23 Claims, 2 Drawing Sheets

COIN RETURN CHUTE FOR TELEPHONE PAY STATION

BACKGROUND OF THE INVENTION

This invention relates to coin return chutes for telephone pay stations and, in particular, to adapting such coin return chutes to prevent theft of coins.

The coin return chutes in use today typically comprise a hollow body having front and back walls and top and bottom walls which are joined by opposing side walls. An intermediate wall is situated between the top and bottom walls and extends from a point below the back of the top wall downwardly toward the front wall to define with the top wall and the side walls a throat for the coin return chute. The bottom wall of the chute extends downwardly from the front wall and then rearwardly upwardly toward the back wall. It thus forms with the intermediate and side walls a trough portion for the chute, the trough extending below and forwardly and rearwardly of the throat.

The front wall of the chute is provided with an opening which is normally closed by a pivotally mounted door and through which a finger of a caller can be inserted to retrieve coins being returned and delivered to the trough. At the rear of the top wall of the chute a further opening is provided. This opening receives from the coin return mechanism of the telephone pay station coins to be returned to a caller. These coins pass through this opening onto the intermediate wall of the throat and are delivered thereby to the trough at the bottom wall for retrieval by the caller as above-described.

In pay stations using coin return chutes of the described type, theft of coins from the chute as a result of so called "stuffing" of the chute has been a continuing problem. In this type of theft, the thief inserts into the throat of the chute via the opening in the front wall and via the trough an obstruction which prevents coins from being delivered from the throat to the trough. This obstruction is left in the pay station over a period of time so that an accumulation of coins occurs. The thief then returns to the pay station, removes the obstruction and the coins fall from the throat into the trough to be recovered by the thief.

Early attempts at trying to prevent this type of theft centered around designing the coin return mechanism of the pay station in such a way that it became disabled when the chute was stuffed. This type of solution is described, for example, in the following U.S. Pat. Nos.: 1,887,576; 1,901,944; 1,921,071; 1,921,072; and 2,004,615. While disabling the coin return mechanism did prevent theft of coins, it also prevented the caller from receiving return of his or her coins in the event a call was not completed. Disabling of the coin return mechanism was thus not an entirely satisfactory solution to the theft problem and was not really feasible in pay stations where access to an operator was not available.

More recent attempts at avoiding this type of theft involved designing the return chute so as to make stuffing of the chute more difficult. In particular, the back wall of the chute below the intermediate wall was brought forward so as to reduce the area of the trough available for a thief to work in when attempting to insert his or her stuffing material. Also, an opening closed by a pivotal door was provided at this portion of the back wall so that the material being used to stuff the chute might pass out of the chute. These design modifications, however, have not proved entirely successful and there still is a need for a more viable way to inhibit theft of telephone pay stations due to stuffing of the coin return chute.

It is therefore a primary object of the present invention to provide a coin return chute for a telephone pay station which is adapted to effectively inhibit stuffing of the chute.

It is a further object of the present invention to provide a coin return chute for a telephone pay station which is adapted to effectively inhibit stuffing of the chute in a manner which can be readily implemented into existing chute designs.

SUMMARY OF THE INVENTION

In accordance with the principles of the present invention, the above and other objectives are realized in a coin return chute of the above type by incorporating in such chute a means for inhibiting stuffing of the throat of the chute while allowing coins being returned to pass from the throat to the trough. In the embodiment of the invention to be described hereinafter, the inhibiting means is in the form of a tubular member mounted in the throat of the chute between the side walls and the top and intermediate walls of the chute. The tubular member is provided at its forward edge situated at the interface of the throat and trough with a cutting and ripping means in the form of pointed teeth. In addition to the tubular member, a blade is mounted to the chute so as to lie centrally of the tubular member at the trough-throat interface. The blade also has a cutting and ripping edge in the form of sharpened teeth. These teeth face the trough-throat interface and the blade is sufficiently thin so as not to obstruct passage of coins from the throat to the trough. A further member is also mounted in the chute below the intermediate member and is provided with triangular projections which extend into the tough and with sharpened teeth at its rear edge which face the back wall of the chute. The latter wall from below the intermediate wall is also further inwardly situated relative to the front wall than in standard chutes, while the front cover is reinforced and its degree of pivot controllably reduced.

With the aforesaid configuration for the return chute of the invention, the chute is found to be substantially unstuffable, while still allowing the proper return of coins. An effective chute arrangement readily adaptable to existing chutes is thereby realized.

BRIEF DESCRIPTION OF THE DRAWINGS

The above and other features and aspects of the present invention will become more apparent upon reading the following detailed description in conjunction with the accompanying drawings in which:

FIGS. 5 and 6 illustrate a further ripping and cutting member incorporated into the chute of FIG. 1.

DETAILED DESCRIPTION

Figure 1:
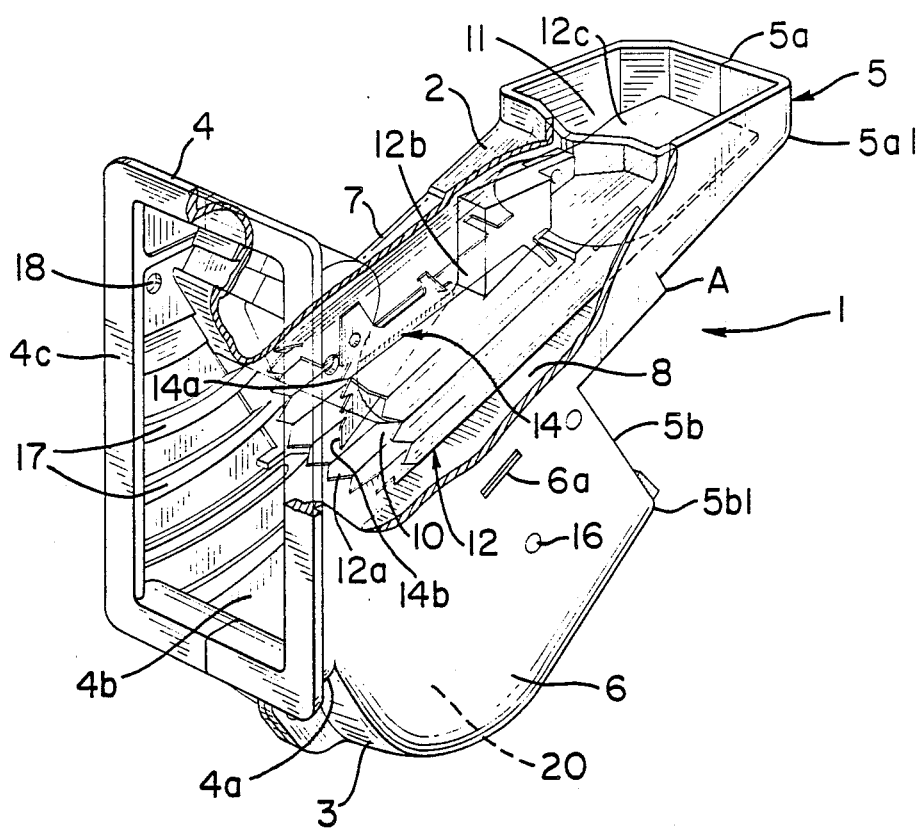
FIG. 1 shows an isometric partially broken view of a return chute adapted in accordance with the principles of the present invention.

FIG. 1 shows a coin return chute 1 in accordance with the principles of the present invention. The chute 1 includes top and bottom walls 2 and 3 and front and back walls 4 and 5. These walls are connected by side walls 6 and 7.

An intermediate wall 8 is situated between the top and bottom walls 2 and 3. The wall 8 extends from the lower end 5a1 of an upper section 5a of the back wall forwardly downwardly to a point short of the front wall 4. In this way, the wall 8 with the side walls 6 and 7 and the top wall 2 defines a throat 10 for the chute 1. An opening 11 at the rear portion of the top wall 2 provides an entry point into the throat 10.

The bottom wall 3 of the chute 1 extends first downwardly from the lower edge 4a of the front wall 4 and then upwardly curvedly to the bottom end 5b1 of a lower section 5b of the back wall 5. A trough 20 for the chute 1 is thereby formed by the bottom wall 3 and the side walls 6 and 7. This trough extends below and forwardly of the throat 10.

The front wall 4 is provided with a large opening 4b bordered by a peripheral flange 4c. The opening 4b is adapted to be closed by a front cover or door 31 which is shown in detail in FIG. 2. The door 31 includes at its upper end a pin 32 whose opposite ends are mounted in openings 18 in the side walls 6 and 7, allowing the door to pivot inwardly. The side walls 6 and 7 are also provided with ridges 17 upon which slots 33 in the door 31 ride during inward movement. At the lower end of the door 31, a blocking piece 34 extends inwardly to inhibit insertion of elements around the bottom of the door when the door is in the inward position.

The top wall 2 of the chute extends in curved fashion from the top edge of the front wall 4 and then downwardly inwardly and then downwardly outwardly to allow space for the door 31 as it pivots inwardly and to also provide a stop surface to limit such inward movement. The top wall 2 then extends rearwardly upwardly to meet the opening 11.

As can be appreciated, the description of the chute 1 to this point is standard. In normal use coins to be returned to a caller are delivered by the coin release mechanism of the telephone pay station to the opening 11 in the top wall 2 of the chute 1. These coins then travel down the intermediate wall 8 of the throat 10. The coins are delivered thereby to the trough 20 and fall to the bottom wall 3. The caller can then pivot back the door in the opening 4c and retrieve the coins.

As is apparent, if the throat 10 of the chute 1 is stuffed with material prior to a caller using the pay station, coins can not pass from the throat to the trough and the caller would be frustrated if his or her call could not be completed and the caller sought return of the deposited coins. In accordance with the principles of the present invention, this problem is avoided by further adapting the coin return chute 1 in a manner that allows coins to be returned to the caller but at the same time substantially inhibits the ability to stuff the throat 10 of the chute.

More particularly, a tubular member 12 is mounted in the throat 10 in abutting relationship with the side walls 6 and 7 and the top and intermediate walls 2 and 8. The tubular member 12 has at its forward edge pointed teeth 12a which are directed at the interface of the throat 10 and trough 20. These pointed teeth in conjunction with the cylindrical shape of the member 12 make it difficult to stuff material into the throat 10 and furthermore cut and/or rip this material, thereby rendering the material substantially innefective as a stuffing means.

This cutting and ripping of the stuffing material by the teeth 12a of the member 12 is further facilitated by an additional thin cutting blade 14 which is mounted interiorly centrally of the member 12 with its cutting teeth 14a and pointed end 14b at the throat-trough interface. The blade 14 thus helps puncture and tear any material attempted to be stuffed into the throat 10. Furthermore, the configuration and location of the member 12 and that of the blade 14 are such as not to inhibit coins from passing from the throat to the trough, thereby not disturbing usual coin return operation.

The cutting blade 14 passes through a central slit 12b in the member 12 and then through the top wall 2. At this point it is sandwiched between flanges 2a, 2b and screws (not shown) passing through the flanges 2a, 2b and the member 14 hold the member to the chute.

Figure 4:
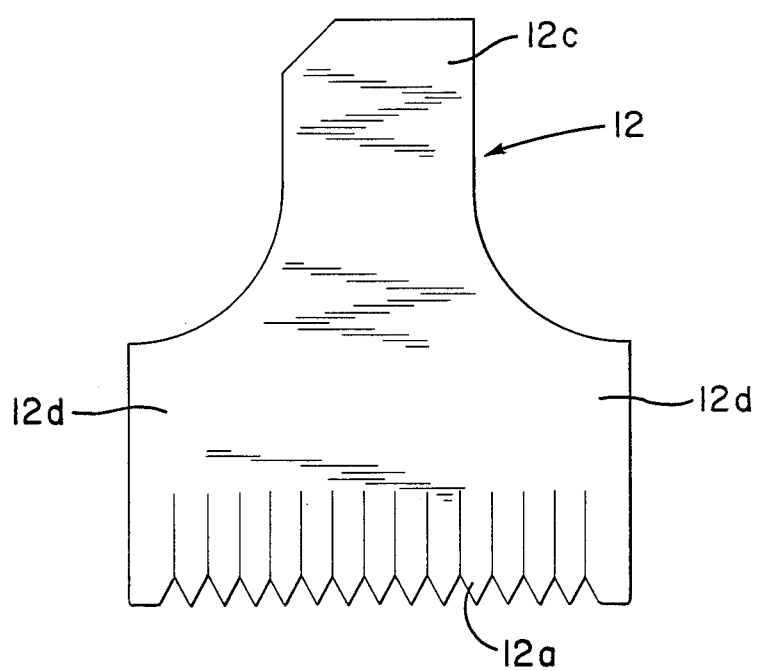
FIG. 4 shows the tubular ripping and cutting member utilized in the chute of FIG. 1.

The tubular member 12, on the other hand, is held in the throat 10 by force fitting the member between the surrounding walls 2, 6, 7 and 8. FIG. 4 shows the member 12 before and the member is rolled into its tubular configuration. In formation, the side portions 12d are rolled so that the member 12 has the central slit 12b along its front portion and an extended portion 12c along its back portion. When the member is force-fit into the throat 10 the extended portion 12c rests on the rearward portion of the intermediate wall 8, while the slit portion contacts the top wall 2. Typically, the member 12 can be made from cadmium or flash plate.

While the members 12 and 14 are directly located in the throat 10 of the chute 1 to inhibit stuffing of material into the throat, a further member 15 is mounted in the trough portion 20 of the chute to also aid in preventing stuffing of the throat. This further member has a upper portion 15a which abuts the undersurface of the intermediate wall 8 and a lower portion 15b which extends from the front edge of the upper portion below and rearward toward the lower section 5b of the back wall 5. The rearward end of this section rests on a dowel 16 supported between the side walls 6 and 7 and positioned so as to place the member 15 under compression. Tabs 15c of the member 15, engage slots 6a and 7a (not shown) in the walls 6 and 7. The dowel 16 and tabs 15c thus secure the member 15 to the chute 1.

Triangular projections 15d depend from the lower portion 15b of the member 15 and protrude rearwardly curvedly into the trough. The rear edge of the lower portion 15b is furthermore provided with pointed teeth 15e facing the section 5b of the rear wall. These projections and teeth also serve to cut and rip any material that may be inserted into the trough 20 for working into the throat 10. The effectiveness of the chute 1 in inhibiting stuffing is thereby further enhanced.

Figure 2:
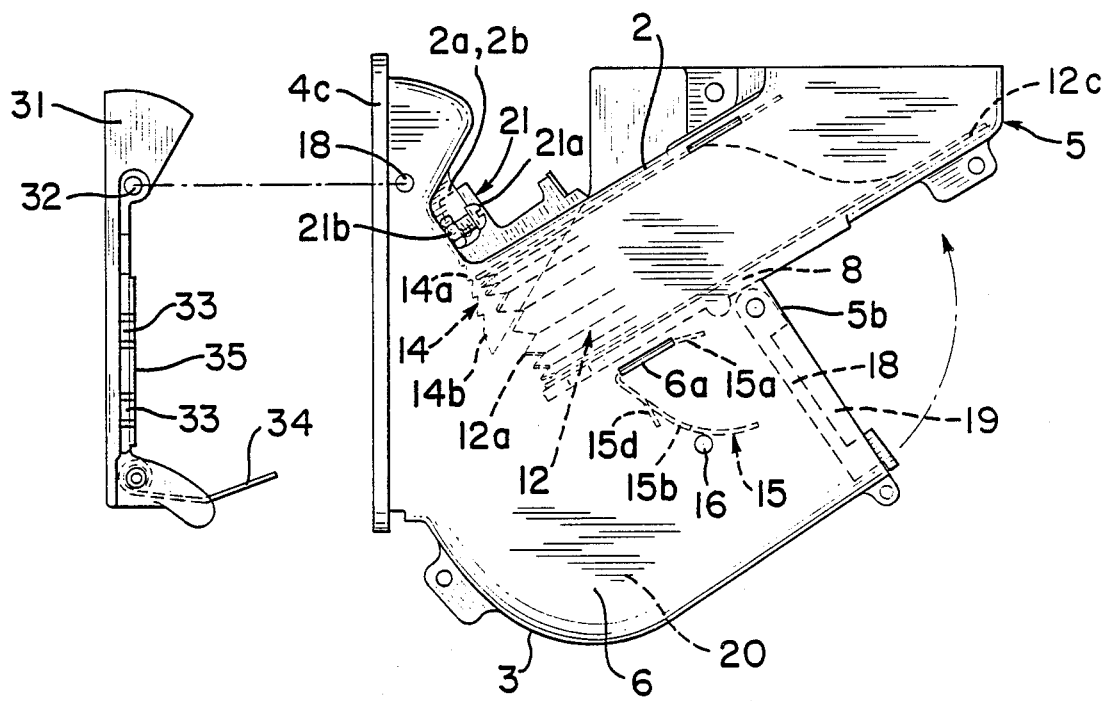
FIGS. 2 and 3 illustrate side and back views, respectively, of the return chute of FIG. 1.
Figure 3:
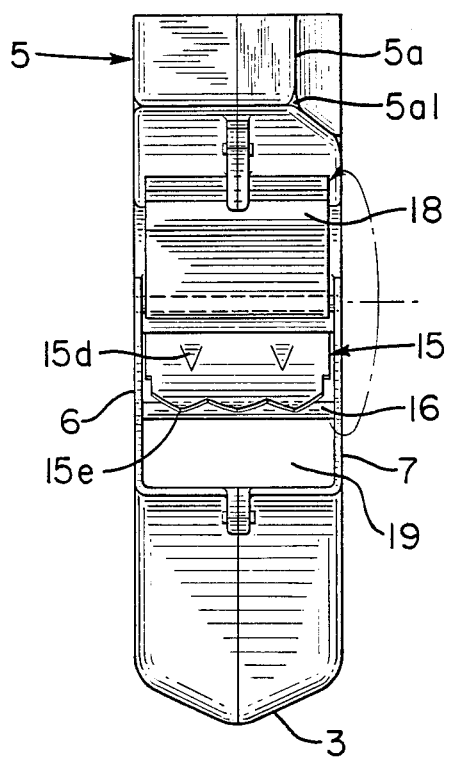
Figure 5A:
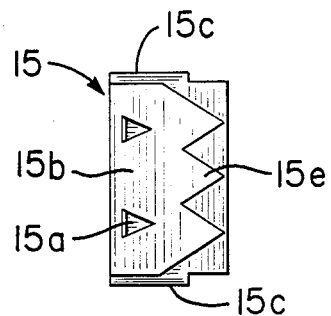
Figure 5B:
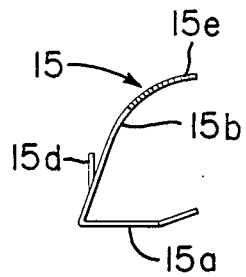

An additional mechanism utilized in the chute 1 to prevent stuffing is incorporated into the door or cover 31 of the chute. In particular, as shown in FIG. 2, the door 31 is further provided with a reinforcing plate or bracket 35 on its back surface. The bracket 35 can be made, for example, of spring steel, and adds strength to the door particularly at the slotted door edges 33. With the door 31 so reinforced, it is extremely difficult to force wire or other implements between the edge of the door and the inner surface of the side walls 6 and 7 when the door is in the inward position. As a result, even if material is inserted in the trough there is no way of pushing material up into the throat 10 for stuffing same.

In order to further retard the ability to work material from the trough 20 of the chute 1 into the throat 10 of the chute, the trough 20 has been further modified from conventional chutes by reducing the rearward extent of the bottom wall from the position A, which is the length in conventional chutes, to the present position which is about midway of the length of the intermediate wall 8. As mentioned above, the working area for stuffing material is thereby reduced, as well as making it more likely that in working the material it will pass out of the usual door 18 pivotally mounted in the standard opening 19 at the back wall of section 5b.

A final attribute of the chute 1 is the use of a stop 21 to controllably limit the inward travel of the door 31 when the door is positioned on the chute 1. As shown, the stop 31 is in the form of a threaded screw 21a and stopnut 21b. The screw 21a is mounted in a threaded bore in the upper end of the top wall 2 and protrudes through the bore into the opening 4a. By turning the screw to various positions the stop position of the door 31 may be controllably set so as to limit the travel of the door and, therefore, the amount of opening available for the insertion of stuffing material.

As can be appreciated from the above, the chute 1 of the invention is adapted in a variety of cooperating ways to successfully avoid having the throat of the chute stuffed with material. Furthermore, conventional chutes can be readily retrofit to incorporate these modifications. An overall better and more desirable chute is thus provided.

In all cases, it is understood that the above-identified arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A coin return chute for use with a telephone pay station comprising:
   a hollow body having front and back walls, top and bottom walls, a wall intermediate the top and bottom walls, and first and second side walls meeting said front, back, top, bottom and intermediate walls, the top wall having an opening towards the rear for receiving coins to be returned to a caller, the front wall having an opening sized to allow entry of the finger of a caller for retrieving from the chute the coins being returned, the intermediate wall extending from a point below the rear of the top wall angularly downwardly toward the front wall to a point short of the front wall, thereby defining with said top wall and said side walls a throat of said chute, the rear wall having a first wall portion extending between the ends of the top and intermediate wall and a second wall portion extending between the intermediate wall and the rear end of the bottom wall, the bottom wall extending downwardly from the front wall and then rearwardly upwardly to the second portion of the rear wall to thereby define a trough of said chute extending below and forward of said throat portion; whereby coins to be returned to a caller are deliverd to said said throat via said opening in said top wall and slide down said intermediate wall of said throat and are caused to fall to said trough at said bottom wall to be retrieved by a caller by inserting his finger into said trough via the opening in said front wall;
   a front cover pivotally mounted relative to said opening of said front wall for normally closing said opening and for permitting access to said trough through pivoting of said door inwardly into said trough;
   and means for inhibiting the stuffing of material into said throat while allowing passage of coins from said throat to said trough.

2. A chute in accordance with claim 1 wherein:
said inhibiting means comprises: a thin hollow tubular member mounted in said throat between said side walls and said top and intermediate walls, said tubular member having a forward end which is adapted for cutting and/or ripping 3. A chute in accordance with claim 2 wherein:
said forward end of said tubular member is situated at the interface of the throat and trough and has pointed teeth.

4. A chute in accordance with claim 3 wherein:
said tubular member is elliptical.

5. A chute in accordance with claim 2 wherein:
said tubular member comprises a bottom tubular section and a top flat section extending from the top back side of the bottom tubular section, the tubular section being slit centrally along its length at its front side,
and said tubular member is forced fit into said throat with the top flat section and the back side of said bottom tubular section abutting said intermediate wall and the front side of said bottom tubular section including said slot abutting said side walls and said top wall.

6. A chute in accordance with claim 5 wherein:
said tubular member is a flat plate have side portions extending from and of lesser height than a central portion, the side portions being rolled toward each other short of touching.

7. A chute in accordance with claim 5 wherein:
said plate comprises one of cadmium and nickel flash plate.

8. A chute in accordance with claim 2 wherein:
said inhibiting means further comprises: a cutting and ripping member situated centrally of said throat;

9. A chute in accordance with claim 8 wherein:
said cutting and ripping member comprises a thin blade having a toothed end terminating in a point said toothed end being disposed at and facing the interface of said throat and trough.

10. A chute in accordance with claim 9 wherein:
said blade has an end portion which protrudes through said top wall;
and said top wall has upstanding flanges sandwiching said protruding end portion of said blade for mounting said blade to said chute.

11. A chute in accordance with claim 8 wherein:
said inhibiting means further comprises: a further cutting and ripping member situated in said trough below said intermediate wall and extending rearwardly toward said second portion of said back wall.

12. A chute in accordance with claim 11 wherein:
said further cutting and ripping member comprises a thin plate having first portion which abuts said intermediate wall and a second portion extending downwardly and rearwardly from the forward edge of said first portion, said second portion of said thin plate having sharp triangular projections extending into the trough and on its rear edge sharpened teeth.

13. A chute in accordance with claim 12 wherein:
said triangular projections have pointed ends facing rearwardly and are bent rearwardly.

14. A chute in accordance with claim 12 wherein:
said inhibiting means further comprises: a bar disposed in the rear portion of said trough between said first and second walls and against which the rear toothed end of said second portion of said thin plate abuts to place said first and second portions of said thin plate in compression.

15. A chute in accordance with claim 14 wherein:
said thin plate is made of spring steel.

16. A chute in accordance with claim 11 wherein:
said inhibiting means further comprises: means for reinforcing said door.

17. A chute in accordance with claim 6 wherein:
said reinforcing means comprises a plate mounted on and extending to the edges of the surface of said door facing said trough.

18. A chute in accordance with claim 7 wherein:
said plate is made of heat treated spring steel.

19. A chute in accordance with claim 6 wherein:
said inhibiting means further comprises: extending said bottom wall rearwardly for a length which is shorter than the length of the bottom wall of standard chutes.

20. A chute in accordance with claim 9 wherein:
said bottom wall extends rearwardly to a point which is approximately at the midway of the length of the intermediate wall.

21. A chute in accordance with claim 19 wherein:
said inhibiting means further comprises: means for limiting the rearward travel of said door.

22. A chute in accordance with claim 1 wherein:
said top wall at its forward edge has an upstanding portion which faces and is closely spaced from the upper end of the front wall; and
said limiting means comprises a member mounted to said upstanding portion of said top wall facing the opening in said front wall.

23. A chute in accordance with claim 2 wherein:
said member is a threaded screw;
and said upstanding portion of said top wall has a threaded bore for receiving said screw.

* * * * *

UNITED STATES PATENT AND TRADEMARK OFFICE
CERTIFICATE OF CORRECTION

PATENT NO. : 4,761,809

DATED : August 2, 1988

INVENTOR(S) : Rudolph P. Brancati

It is certified that error appears in the above-identified patent and that said Letters Patent is hereby corrected as shown below:

```
Col. 4, line 3, change "innefective" to -- ineffective --
Col. 4, line 36, change "a" to -- an --
Col. 6, line 17, insert -- . -- after "ripping"
Col. 6, line 37, change "have" to -- having --
Col. 6, line 41, claim "7" change"5" to -- 6 --.
Col. 6, line 46, claim "8" change ";" to -- . --
Col. 7, line 20, claim 17, change "6" to -- 16 --
Col. 7, line 25, claim 18, change "7" to -- 17 --
Col. 8, line 2, claim 19, change "6" to -- 16 --
Col. 8, line 7, claim 20, change "9" to -- 19 --
Col. 8, line 14, claim 22, change "1" to -- 21 --
Col. 8, line 21, claim 23, change "2" to -- 22 --
```

Signed and Sealed this

Thirty-first Day of January, 1989

Attest:

DONALD J. QUIGG

*Attesting Officer*　　　*Commissioner of Patents and Trademarks*